US007883216B2

(12) United States Patent
Yang

(10) Patent No.: US 7,883,216 B2
(45) Date of Patent: Feb. 8, 2011

(54) METHODS AND SYSTEMS FOR MULTIPLE PRIMARY COLOR DISPLAY

(75) Inventor: Long Yang, Union City, CA (US)

(73) Assignee: High Definition Integration Ltd., Grand Cayman (KY)

( * ) Notice: Subject to any disclaimer, the term of this patent is extended or adjusted under 35 U.S.C. 154(b) by 1299 days.

(21) Appl. No.: 11/352,289

(22) Filed: Feb. 13, 2006

(65) Prior Publication Data

US 2007/0188718 A1      Aug. 16, 2007

(51) Int. Cl.
*G03B 21/14* (2006.01)
(52) U.S. Cl. ...................................................... 353/84
(58) Field of Classification Search ................... 353/20, 353/31, 34, 82, 84, 85; 359/211, 634; 349/5, 349/7, 8, 9, 97, 104; 348/724, 742, 743
See application file for complete search history.

(56) References Cited

U.S. PATENT DOCUMENTS

| | | | | |
|---|---|---|---|---|
| 5,517,340 A * | 5/1996 | Doany et al. | | 349/5 |
| 5,805,243 A * | 9/1998 | Hatano et al. | | 349/5 |
| 6,280,034 B1 * | 8/2001 | Brennesholtz | | 353/20 |
| 6,327,093 B1 * | 12/2001 | Nakanishi et al. | | 359/634 |
| 6,493,149 B2 * | 12/2002 | Ouchi | | 359/634 |
| 6,621,529 B2 * | 9/2003 | Ohara et al. | | 348/743 |
| 6,714,353 B2 * | 3/2004 | Park et al. | | 359/640 |
| 6,726,333 B2 * | 4/2004 | Huibers et al. | | 353/84 |
| 6,739,723 B1 * | 5/2004 | Haven et al. | | 353/20 |
| 6,765,705 B2 * | 7/2004 | Ouchi | | 359/216.1 |
| 6,805,450 B2 * | 10/2004 | Nishida et al. | | 353/98 |
| 6,824,270 B2 * | 11/2004 | Kim et al. | | 353/31 |
| 6,827,450 B1 * | 12/2004 | McGettigan et al. | | 353/31 |
| 6,828,961 B2 * | 12/2004 | Elliott et al. | | 345/213 |
| 6,870,523 B1 | 3/2005 | Ben-David et al. | | |
| 6,876,403 B1 * | 4/2005 | Tajiri | | 349/9 |
| 6,899,440 B2 * | 5/2005 | Bierhuizen | | 362/19 |
| 6,961,179 B2 * | 11/2005 | Chen et al. | | 359/485 |
| 7,104,652 B2 * | 9/2006 | Kojima | | 353/33 |
| 7,125,123 B2 * | 10/2006 | Kwon et al. | | 353/84 |
| 7,165,847 B2 * | 1/2007 | Pettitt | | 353/84 |
| 7,170,567 B2 * | 1/2007 | Ouchi et al. | | 348/750 |
| 7,212,359 B2 * | 5/2007 | Richards et al. | | 359/891 |
| 7,237,899 B2 * | 7/2007 | Ma et al. | | 353/20 |
| 7,242,543 B1 * | 7/2007 | Yang et al. | | 359/891 |
| 7,268,757 B2 * | 9/2007 | Ben-David et al. | | 345/88 |
| 7,300,159 B2 * | 11/2007 | Vanlier | | 353/84 |
| 7,301,543 B2 * | 11/2007 | Higgins | | 345/589 |
| 7,303,287 B2 * | 12/2007 | De Vaan | | 353/85 |
| 7,347,562 B2 * | 3/2008 | Greenberg et al. | | 353/31 |
| 7,352,488 B2 * | 4/2008 | Ben-Chorin et al. | | 358/1.9 |
| 7,364,305 B2 * | 4/2008 | Itoh | | 353/31 |
| 2002/0048000 A1 * | 4/2002 | Nishida et al. | | 353/98 |

(Continued)

*Primary Examiner*—Georgia Y Epps
*Assistant Examiner*—Danell L Owens
(74) *Attorney, Agent, or Firm*—Sterne, Kessler, Goldstein & Fox P.L.L.C.

(57) ABSTRACT

Methods and systems for multiple primary color display are provided. Methods and systems of the present invention improve the spectrum efficiency of a color display system, and provide enhanced brightness and color gamut. In an embodiment, methods and systems of the present invention improve the brightness of a color display system employing a high pressure lamp by efficiently incorporating lights components of the lamp output that are outside the red, green, and blue spectrum in creating the color image.

6 Claims, 14 Drawing Sheets
(1 of 14 Drawing Sheet(s) Filed in Color)

U.S. PATENT DOCUMENTS

| | | | | |
|---|---|---|---|---|
| 2003/0020839 A1* | 1/2003 | Dewald | | 348/743 |
| 2003/0030913 A1* | 2/2003 | Park et al. | | 359/634 |
| 2004/0056983 A1* | 3/2004 | Dean | | 348/679 |
| 2004/0057018 A1* | 3/2004 | Cho et al. | | 353/31 |
| 2004/0114112 A1* | 6/2004 | Kim et al. | | 353/31 |
| 2004/0130684 A1* | 7/2004 | Kim et al. | | 353/84 |
| 2004/0246445 A1* | 12/2004 | Cho et al. | | 353/31 |
| 2004/0263793 A1* | 12/2004 | Kim et al. | | 353/33 |
| 2005/0012904 A1* | 1/2005 | Kim et al. | | 353/31 |
| 2005/0078056 A1* | 4/2005 | Childers | | 345/32 |
| 2005/0157273 A1* | 7/2005 | Collins et al. | | 353/84 |
| 2005/0157274 A1* | 7/2005 | Lin | | 353/84 |
| 2005/0206846 A1* | 9/2005 | Yeung et al. | | 353/20 |
| 2005/0259225 A1* | 11/2005 | Greenberg et al. | | 353/31 |
| 2006/0039068 A1* | 2/2006 | Tokita et al. | | 359/483 |
| 2007/0079232 A1* | 4/2007 | De Vaan | | 715/512 |
| 2007/0165186 A1* | 7/2007 | Copner et al. | | 353/30 |
| 2007/0165317 A1* | 7/2007 | Thollot et al. | | 359/892 |

* cited by examiner

METHODS AND SYSTEMS FOR MULTIPLE PRIMARY COLOR DISPLAY

FIELD OF THE INVENTION

The present invention relates generally to display systems. More particularly, the invention relates to methods and systems for multiple primary color display.

BACKGROUND OF THE INVENTION

For display systems, high pressure lamps represent the brightest and the most energy-efficient light sources. High pressure lamps are characterized by a broad spectrum, which includes substantial intensity in the yellow light wavelength. It is desirable, therefore, to incorporate the yellow light into display systems that use high pressure lamps.

To produce color, typical display systems employ three filters for red, blue, and green as primary colors. Incorporating yellow in such systems (for example, using a green/yellow filter), however, results in significant reduction of the color gamut of the system.

One solution to the above problem, in single-panel systems, incorporates yellow as a fourth primary color. While the color gamut is not reduced, a problem arises in a sub-optimized overall brightness of the display. This is due to the fact that when more primary colors are added, the (liquid crystal) panel may not have sufficient time to switch to a fully-on state for certain of the primary colors.

Two-panel systems provide enhanced brightness compared to single-panel systems, by dedicating a second panel to receive more color components of the emitted light. However, typical two-panel systems are not optimized; they continue to filter out the yellow light to ensure a good color gamut, and, as a result, limit the overall lumen output.

What is needed therefore are methods and systems for single-panel and two-panel color display systems that provide improved overall brightness and color gamut.

BRIEF SUMMARY OF THE INVENTION

The present invention relates to methods and systems for multiple primary color display. Methods and systems of the present invention improve the spectrum efficiency of a color display system, and, subsequently, provide enhanced brightness and color gamut. In an embodiment, methods and systems of the present invention improve the brightness of a color display system employing a high pressure lamp by efficiently incorporating the yellow light output of the lamp in creating the color image. The present invention, however, is not limited to high pressure lamps and may be used for any other type of lamp having substantial energy outside the red, blue, and green spectrum (for example, yellow, cyan, etc.) of the visible wavelength.

Embodiments of the present invention may be used in single-panel and/or two-panel or more display systems.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The application file contains at least one drawing executed in color. Copies of this patent application publication with color drawings will be provided by the Office upon request and payment of the necessary fee.

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION OF THE INVENTION

Introduction

Figure 1:
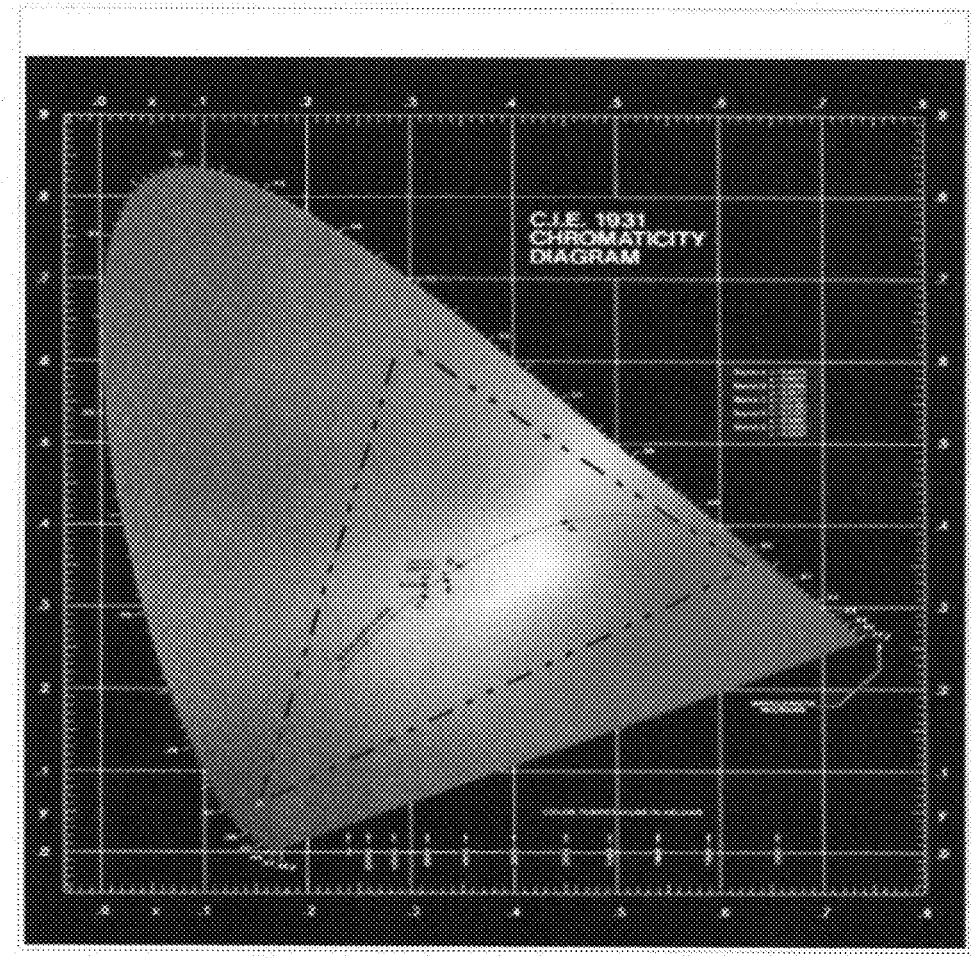
FIG. 1 illustrates a chromaticity diagram and a typical RGB color gamut.

FIG. 1 illustrates a chromaticity diagram 100 and a typical RGB color gamut. Conic area 110 in the diagram represents the gamut of all colors visible to the human eye. Triangle 112, defined by vertices R, G, and B, represents the color gamut that can be achieved using the red, green, and blue colors as primary colors. Triangle 112 is clearly a subset of conic area 110, since not all visible colors can be generated from the mixing of red (R), green (G), and blue (B) colors.

Color display systems typically represent color using the RGB color gamut. Colors not falling within the RGB gamut are typically represented by their closest colors in the RGB gamut. For example, the gold color typically appears as yellow in RGB-based color display systems.

As described above, high pressure lamps, such as high pressure sodium (HPS) lamps, for example, represent the brightest and the most energy-efficient light sources for display systems. A substantial amount of the lumen output of such lamps, however, falls in the yellow color wavelength. When used in RGB-based systems, accordingly, the overall lumen output is not optimally utilized. This is further illustrated with reference to FIG. 2.

Figure 2:
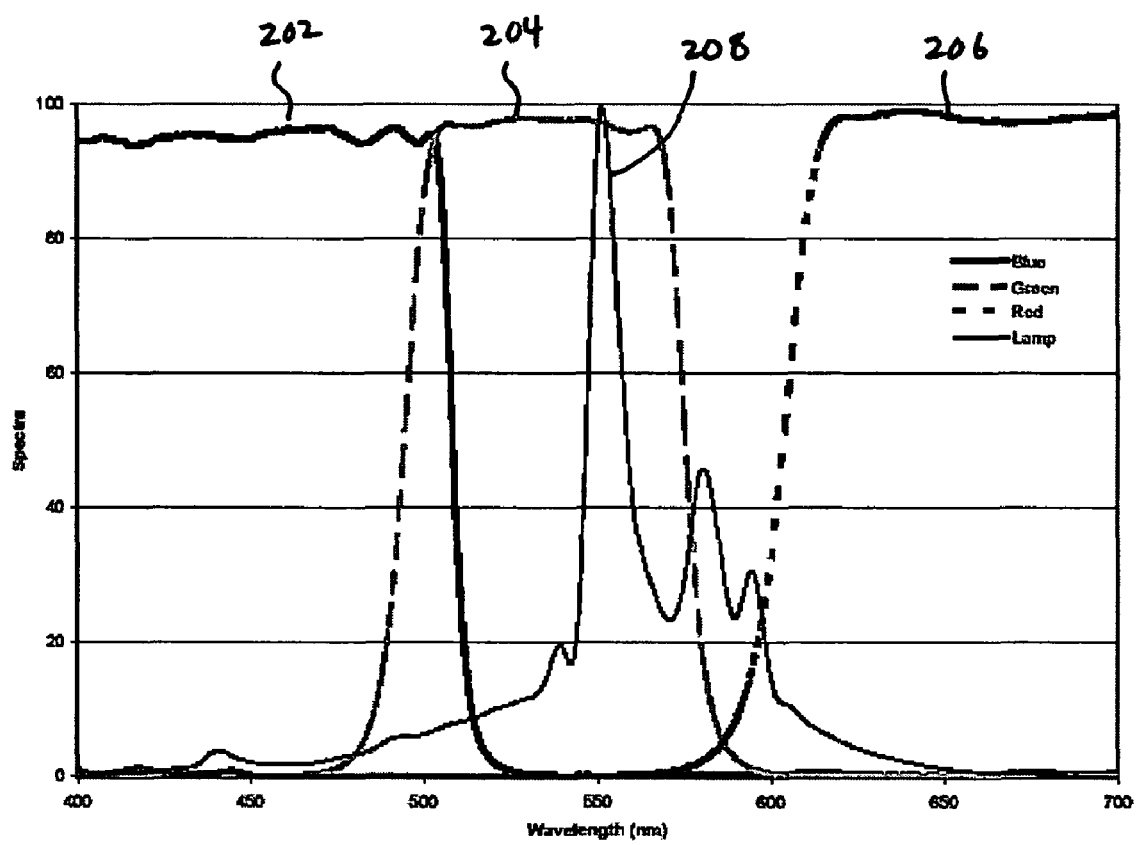
FIG. 2 illustrates the spectra of a typical RGB system and a normalized output spectrum of a high pressure lamp.

FIG. 2 illustrates the spectra of a typical RGB system and a normalized output spectrum of a high pressure lamp. In FIG.

2, line 202 represents the spectrum of a blue color filter. Line 202 shows that a blue color filter passes with high efficiency color wavelengths shorter than approximately 500 nm. Similarly, lines 204 and 206 represent the spectra of green and red color filters, respectively.

Still referring to FIG. 2, line 208 represents a normalized output spectrum of a typical high pressure lamp. The output spectrum represents a light intensity distribution over the spectrum of wavelengths emitted by the lamp. For example, it is noted that a typical high pressure lamp emits with highest intensity color wavelengths around 550 nm. It is further noted that the output spectrum of a typical high pressure lamp is characterized by two peaks 210 and 212 in close proximity to the yellow color wavelength (approximately 570 nm). Notice, however, that the intensity represented by peaks 210 and 212, in FIG. 2, would be very inefficiently passed in a typical RGB display system because they fall at the extremities of the passbands illustrated by 202, 204, and 206. For example, less than 20% of the intensity contained in peak 210 would be passed. This clearly results in less than optimal display brightness. On the other hand, modifying the RGB system to include yellow (for example, replacing the green filter with a green/yellow filter) significantly reduces the color gamut of the system. Referring to FIG. 1, this corresponds to moving vertex G of RGB color gamut triangle 112 in the direction of point Y (yellow), effectively reducing the size of the triangle.

Accordingly, it is desirable to incorporate the yellow color in display systems while maintaining good color gamut, thereby optimizing the utilization of the lamp's lumen output.

The present invention provides methods and systems for improved spectrum efficiency, and subsequently, improved brightness and color gamut of color display systems. Embodiments of the present invention may be used in single-panel and/or two-panel display systems.

1—Panel Optical Display System

Figure 3:
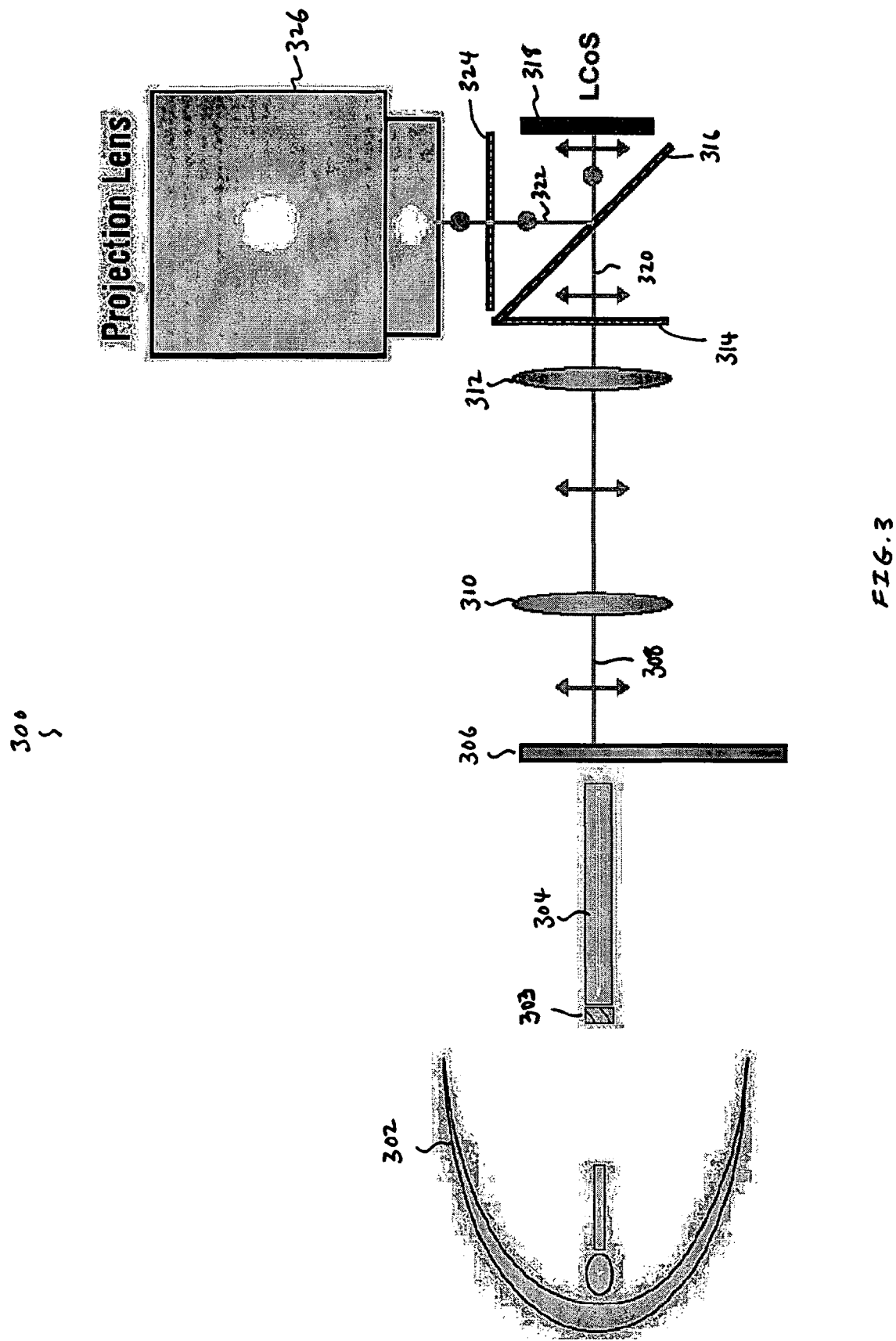
FIG. 3 is a block diagram that illustrates a 1-Panel display system.

FIG. 3 is a block diagram that illustrates an example 1-Panel color display system 300. In the example of FIG. 3, lamp 302 emits a polychromatic light. Lamp 302 may be a high pressure lamp, for example. Light from lamp 302 is first passed through a lightpipe 304 for purposes of homogenization of the illumination and polarization conversion. Polarization conversion portion 303 at the entrance surface of lightpipe 304 is typically needed because the light emitted by lamp 302 is generally unpolarized. At the output of lightpipe 304, light is polarized. In the example of FIG. 3, light is p-polarized after exiting lightpipe 304 (the electric field of the light oscillates in the plane of the diagram). It is noted that polarization conversion can be done in a variety of ways. Using a lightpipe, as shown in the example of FIG. 3, is one of the simplest approaches to perform polarization conversion but other approaches may also be used as can be understood by a person skilled in the art(s).

At the exit surface of lightpipe 304, a color wheel 306 is positioned such as to receive the light from lightpipe 304 and generate filtered light 308. Color wheel 306 is typically divided into one or more color filter segments. The sizes of the different segments may or may not be equal depending on the optical system. Further, color wheel 306 typically rotates so as to sequentially place different color filters in the path of the polychromatic light. Accordingly, color wheel 306 sequentially passes different color components of the polychromatic light. The rotation speed of color wheel 304 is related to a frame refresh rate of display system 300.

Still referring to FIG. 3, filtered light 308 is passed through one or more relay lenses, as illustrated by relay lenses 310 and 312, to focus the light in the direction of light modulating panel 318. In an embodiment, light modulating panel 318 is a Liquid Crystal on Silicon (LCoS) panel. In other embodiments, light modulating panel 318 is a transmissive liquid crystal display (LCD) or a digital mirror such as a Digital Light Processing (DLP) panel. Prior to reaching light modulating panel 318, however, the light is passed through a pre-polarizer 314, which ensures that the light is uniformly polarized (in the example of FIG. 3, light 320 is uniformly p-polarized as indicated by the double-ended arrow).

Being p-polarized, light 320 passes, with very little reflection, through a polarization beam splitter (PBS) 316 to reach light modulating panel 318. Light modulating panel 318 modulates light 320 according to voltage values applied to pixels of the panel. Typically, a pixel of light modulating panel 318 reflects, deflects, or blocks light 320 according to a voltage applied thereto, thereby modulating the brightness of the light. In an embodiment using LCoS panels, light modulating panel 318 converts some portion of p-polarized light 320 into an s-polarized light 322 (the electric field of light 322 oscillates in a plane perpendicular to the plane of the diagram), depending on a voltage applied thereto. Accordingly, the s-polarized light 322 is reflected by PBS 316 in the direction of projection lens 326. The remaining p-polarized portion of p-polarized light 320 passes through PBS 316 with minimal reflection. Therefore, the brightness of the pixel depends on how much initial s-polarized light is converted into p-polarized light (using lightpipe 304). A post-polarizer 324 is used prior to light 322 reaching projection lens 326 in order to remove any light components having unwanted polarization. This generally improves the contrast ratio of the image. Projection lens 326 receives light 322 and projects a corresponding color image.

Figure 4:
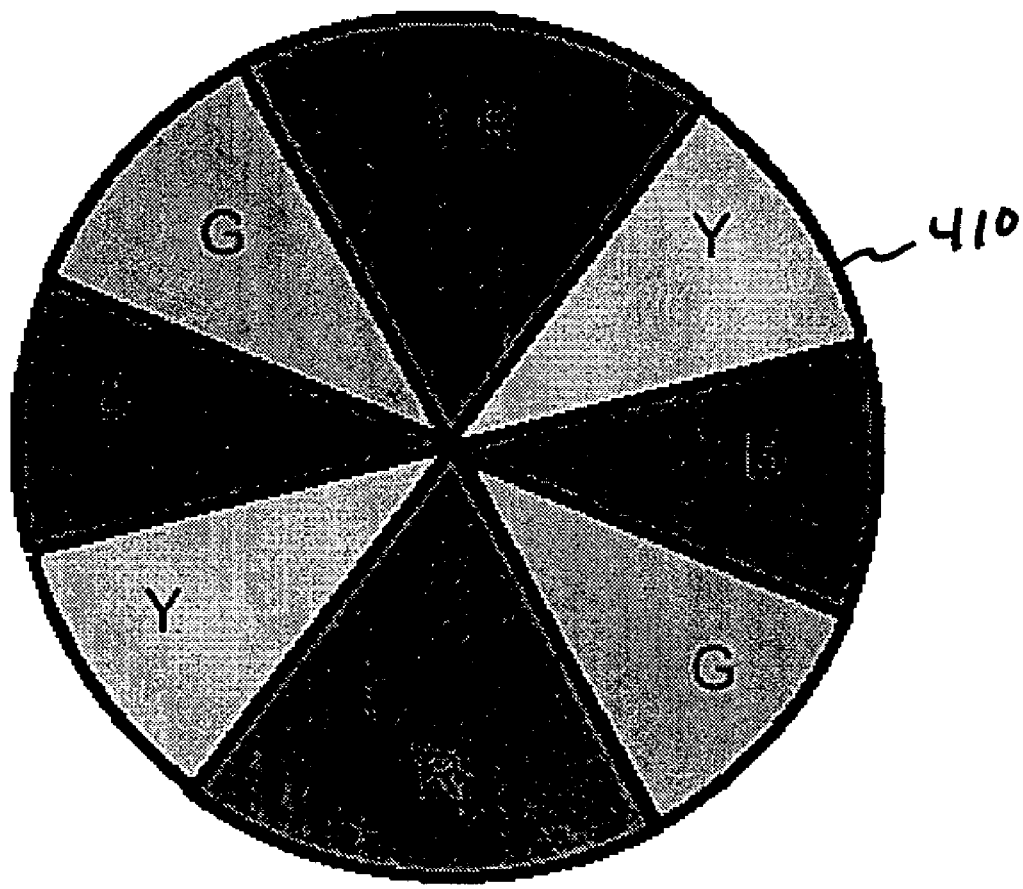
FIG. 4 illustrates a color wheel that may be employed in the system of FIG. 3.

FIG. 4 illustrates a color wheel 410 that may be employed in the color display system of FIG. 3. Color wheel 410 may be used for color wheel 306 in FIG. 3, for example. Color wheel 410 includes four primary colors red (R), green (G), blue (B), and yellow (Y), and is divided into eight segments. The sizes of the segments are not all equal. Typically, the actual proportion of each segment depends on the system design to achieve the desired brightness, color gamut, and white point. For example, in FIG. 4, the red (R) segments are larger than those of the other colors. This can be useful when color wheel 410 is designed for use with a high pressure lamp, which typically outputs less light in the red wavelength than in the other primary color wavelengths (G, B, and Y). An output spectrum of a high pressure lamp was described above with reference to FIG. 2. Note that the number of segments of the color wheel depends on the system design and is not limited to 8 segments as used in the example of FIG. 4.

Note that using color wheel 410 in the system of FIG. 3 is one solution for incorporating the yellow color into the display system without significantly reducing the color gamut of the system as described above. However, by adding more primary colors to the color wheel, the amount of time that the light modulating panel is exposed to color wavelengths having smaller segment sizes (the green color in FIG. 4, for example) may not be sufficient for pixels of LCoS panel 318 to transition to a fully-on state. Accordingly, the overall brightness of the display may be sub-optimized. Further, trying to lessen this problem by slowing down the color wheel lowers the possible frame refresh rate of the system, and, subsequently, reduces the quality of the image.

Methods and systems for multiple primary color display for 1-Panel optical systems will now be provided according to embodiments of the present invention.

Figure 5:
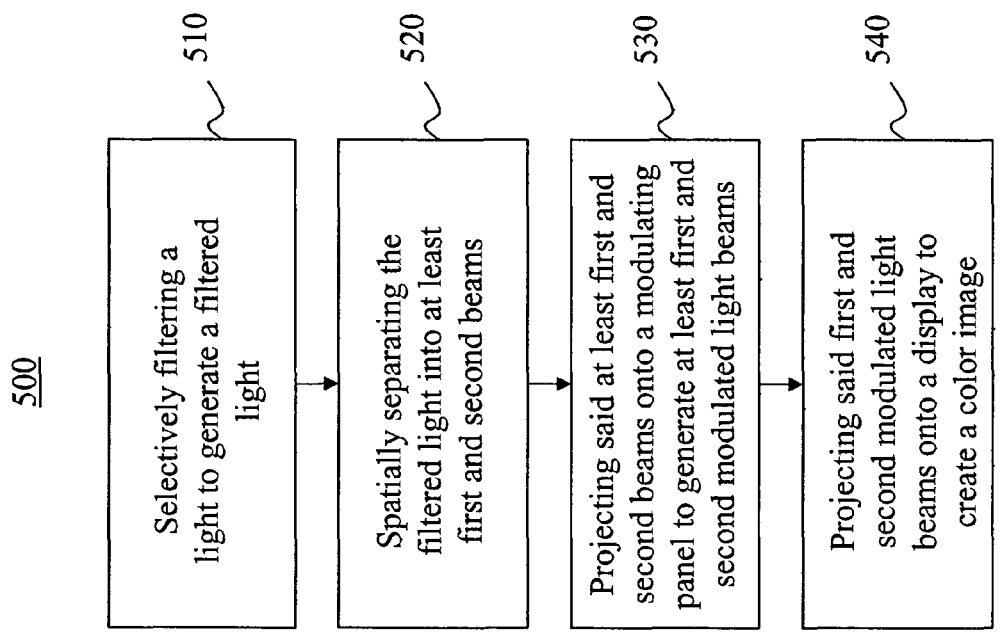
FIG. 5 is a process flowchart for a multiple primary color display method.

FIG. 5 is a process flowchart 500 for a multiple primary color display method according to an embodiment of the present invention. Process flowchart 500 begins in step 510, which includes selectively filtering a light to generate a filtered light. In an embodiment, the filtered light is not one of the primary colors used to generate the image. In another embodiment, step 510 includes passing the light through a rotating color wheel that includes one or more color filter segments, thereby sequentially passing different color components of the light. In an embodiment, the color wheel includes no primary color filter segments. For example, the color wheel includes no red (R), green (G), blue (B), or yellow (Y) filter segments. In another embodiment, each of the one or more color filter segments of the wheel passes a pair of primary color components. In an embodiment, the color filter segments include a Y/B filter segment, which passes yellow and blue color components of the light. In another embodiment, the color filter segments include a R/G filter segment, which passes red and green color components of the light.

Step 520 includes spatially separating the filtered light into at least first and second beams. The at least first and second beams have different colors. In an embodiment, the at least first and second beams are primary color components. In an embodiment, the filtered light is separated into a yellow color beam and a blue color beam. In another embodiment, the filtered light is separated into a Red color beam and a green color beam.

Step 530 includes projecting the at least first and second beams onto a modulating panel to generate at least first and second modulated light beams. In an embodiment, the at least first and second beams are projected without overlap onto at least first and second portions of the modulating panel. In an embodiment, the first and second portions of the modulating panel are non-overlapping, and each occupies one half of the panel. In another embodiment, step 530 further includes rotating the at least first and second beams such that the beams cycle between the at least first and second portions of the modulating panel. This is known as beam scrolling, as the overall effect of step 530 is to have different color beams that scroll over the modulating panel. Beam scrolling is described below with reference to FIGS. 6 and 7A.

Step 540 includes projecting the at least first and second modulated light beams onto a display to create a corresponding color image.

Figure 6:
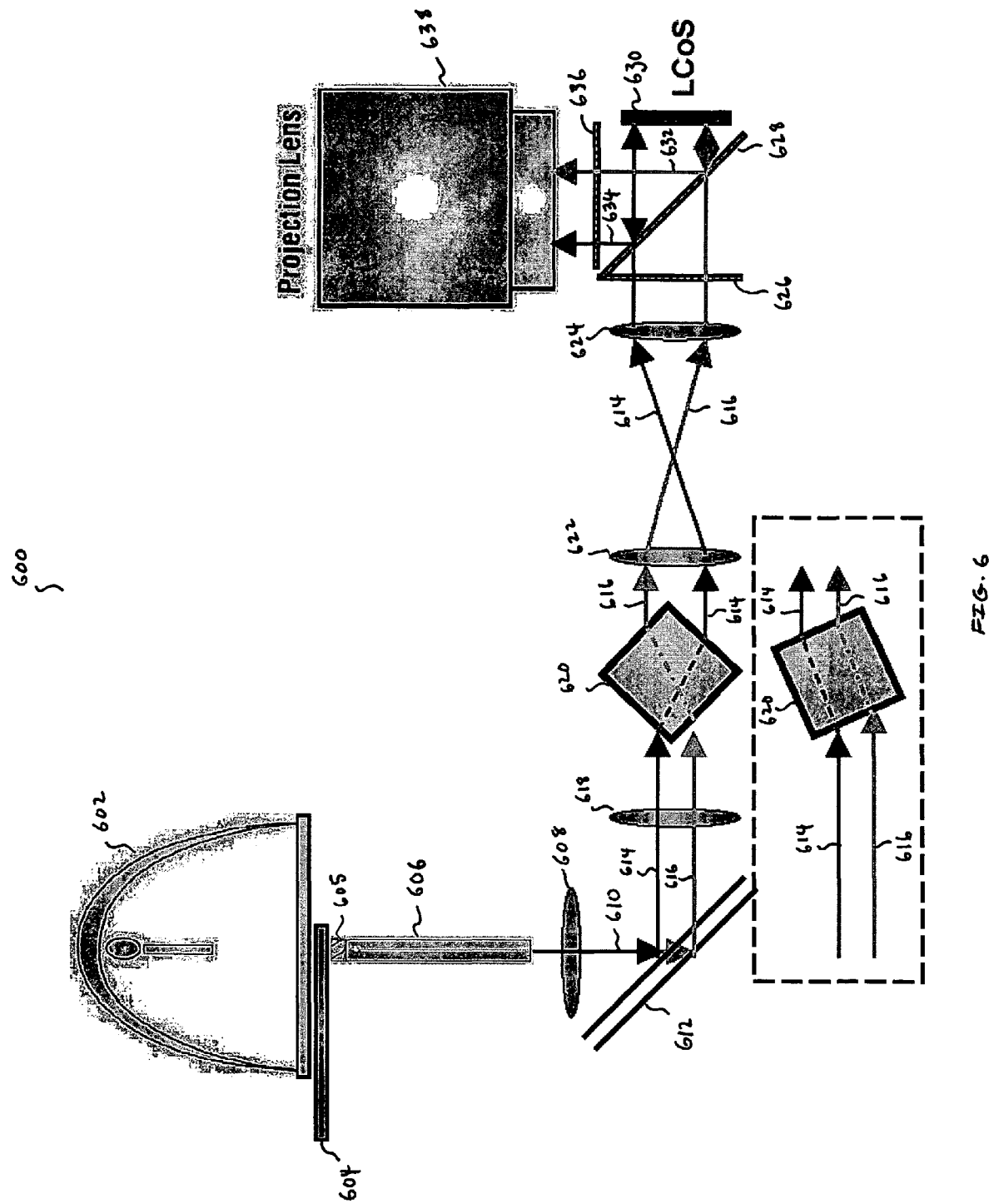
FIG. 6 is a block diagram that illustrates an example multiple primary color display system.

FIG. 6 is a block diagram that illustrates an example multiple primary color display system 600. System 600 may be used to implement process flowchart 500.

In the example of FIG. 6, lamp 602 emits a polychromatic light. In an embodiment, lamp 602 represents a high pressure lamp. Light from lamp 602 is first passed through a color wheel 604 to generate a filtered light. In an embodiment, color wheel 604 is divided into one or more color filter segments. The sizes of the different segments may or may not be equal depending on the optical system design. Further, color wheel 604 rotates according to a frame refresh rate of display system 600. In other embodiments, the color wheel may be replaced with a color drum or liquid crystal (LC) shutters. Accordingly, color wheel 604 sequentially places different color filters in the path of the polychromatic light emitted by lamp 602, thereby sequentially passing different color components of the polychromatic light. In an embodiment, the one or more filter segments of the color wheel include no primary color filter segments. Accordingly, the filtered light is not a primary color. For example, the color wheel includes no red (R), green (G), blue (B), or yellow (Y) filter segments. In another embodiment, the one or more color filter segments include a Y/B filter segment and a R/G filter segment.

Light filtered by color wheel 604 is passed through a lightpipe 606 for purposes of homogenization of the illumination and polarization conversion. Polarization conversion portion 605 at the entrance surface of lightpipe 606 is typically needed because the light emitted by lamp 602 is generally unpolarized. At the output of lightpipe 606, light is polarized. In another embodiment, lightpipe 606 precedes color wheel 604. It is noted that polarization conversion can be done in a variety of ways. Using a lightpipe, as shown in the example of FIG. 6, is one of the simplest approaches to perform polarization conversion but other approaches may also be used as can be understood by a person skilled in the art(s).

Still referring to FIG. 6, light 610 output from lightpipe 606 is projected onto a spatial light separator 612. In an embodiment, a relay lens 608 is used between lightpipe 606 and spatial light separator 612 to focus the light. In an embodiment, spatial light separator 612 represents a 45° filter that separates filtered light 610 into at least first and second beams 614 and 616. In an embodiment, the first and second beams represent primary colors.

Still referring to FIG. 6, first and second beams 614 and 616 are projected in the direction of light modulating panel 630. In an embodiment, light modulating panel 630 is a LCoS panel. In other embodiments, light modulating panel 630 is a transmissive liquid crystal display (LCD) or a digital mirror such as a Digital Light Processing (DLP) panel. In another embodiment, beams 614 and 616 are projected onto a rotating prism 620, which rotates between two positions as shown in FIG. 6 so as to cycle beams 614 and 616 up and down onto light modulating panel 630. In an embodiment, rotating prism 620 selectively places beams 614 and 616 onto first and second portions of light modulating panel 630, wherein the first and second portions are non-overlapping. The overall effect is to have different color beams that scroll over the light modulating panel, and is known as beam scrolling. In other embodiments, other mechanisms alternative to rotating prism 620 may be used to cycle the beams 614 and 616 up and down onto light modulating panel 630. In another embodiment, one or more relay lenses, illustrated as 618, 622, and 624, are further placed in the path of the light between the spatial light separator 612 and light modulating panel 630.

Still referring to FIG. 6, prior to reaching light modulating panel 630, beams 614 and 616 pass through a pre-polarizer 626, which ensures that the two beams are uniformly polarized. Subsequently, the two beams 614 and 616 are passed through a polarization beam splitter (PBS) 628. Being of a given polarization, the two beams are passed without reflection by PBS 628. When beams 614 and 616 reach light modulating panel 630, they are modulated according to voltage values applied to pixels of the panel. Typically, a pixel of light modulating panel 630 reflects, deflects, or blocks light according to a voltage applied thereto, thereby modulating the brightness of the light. In an embodiment using LCoS panels, light modulating panel 630 converts some portions of beams 614 and 616 into opposite polarization depending on a voltage applied thereto. Accordingly, portions of beams 632 and 634 reflected by light modulating panel 630 are further reflected by PBS 628 in the direction of projection lens 638. The remaining portions of beams 632 and 634 pass through PBS 628 with minimal reflection. Therefore, the brightness of the pixel depends on how much initial polarization conversion occurs in lightpipe 606. A post-polarizer 636 is used prior to beams 632 and 634 reaching projection lens 638 in order to remove any light components of unwanted polarization. This generally improves the contrast ratio of the image. Projection lens 638 receives beams 632 and 634 and projects a corresponding color image.

Figure 7A:
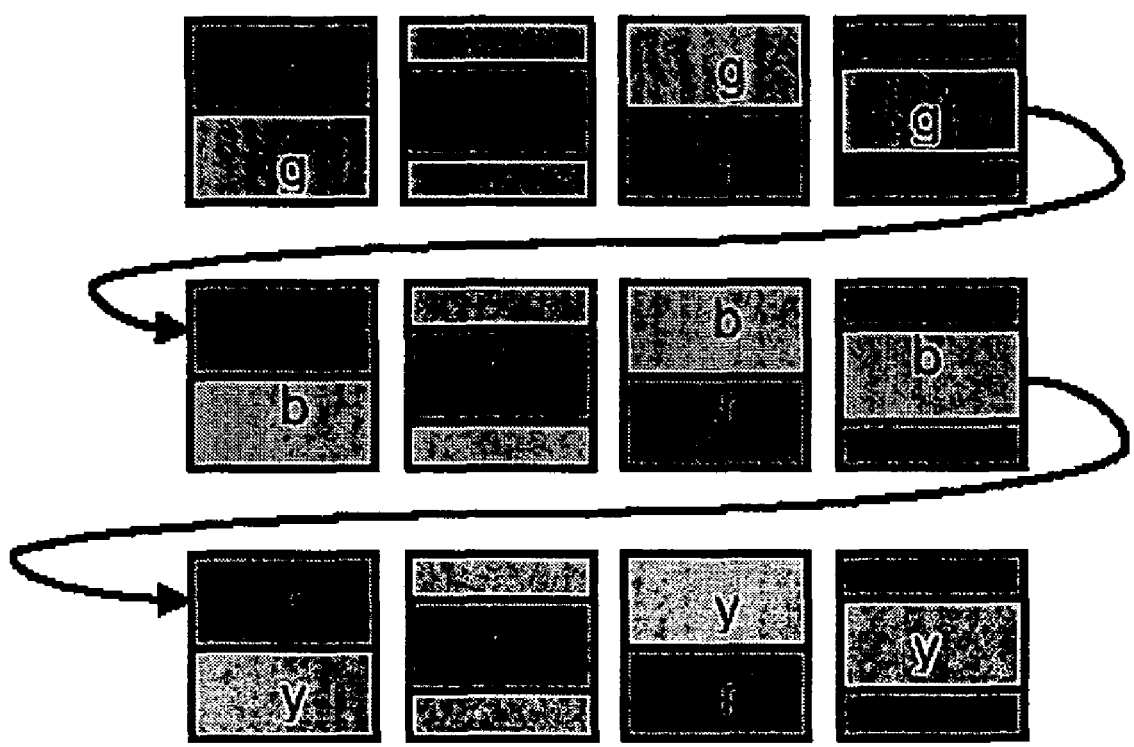
FIG. 7A is an example diagram of beam scrolling.

FIG. 7A is an example that illustrates beam scrolling as described above in the embodiment of FIG. 6. FIG. 7A illustrates a sequence of beams that are projected onto a light modulating panel using a corresponding color wheel. Note that at any time, at least two beams are projected. The proportion of time that each color beam is passed depends on the system design to achieve the desired brightness, color gamut, and white point. For example, in FIG. 7A, red (r) is passed at all times, while blue (b), green (g), and yellow (y) are passed sequentially. This may be the case, for example, when using a high pressure lamp, which typically provides less light in the red color wavelength than in the other color wavelengths (G, B, and Y). It is noted here that depending on system design, more than four colors may also be passed. For example, in certain display systems five or six colors may be passed during a full wheel cycle.

Using beam scrolling, as depicted in FIG. 7A, in the system of FIG. 6 provides one solution for exploiting the yellow color light present in the output of a high pressure lamp. Beam scrolling provides a good color gamut, and does not reduce the brightness of the system as is the case for using the color wheel described in FIG. 4, for example.

Figure 7B:
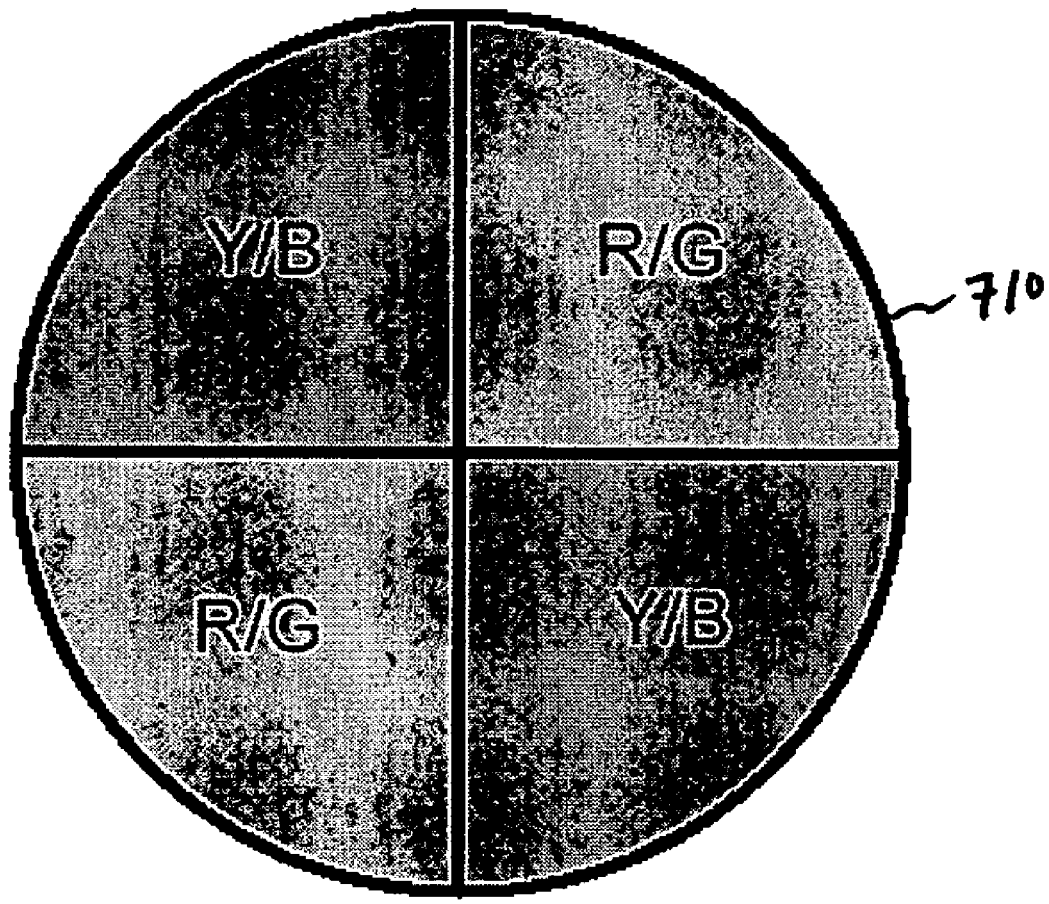
FIG. 7B illustrates a color wheel that may be employed in the system embodiment of FIG. 6.

FIG. 7B illustrates a color wheel 710 that may be employed in the system embodiment of FIG. 6. Color wheel 710 may be used for color wheel 604 in FIG. 6. Color wheel 710 includes two Y/B filter segments and two R/G filter segments all of equal size. The Y/B filter filters all but yellow and blue light. The R/G filters all but red and green light. Typically, the actual proportion of each segment depends on the system design to achieve the desired brightness, color gamut, and white point.

Color wheel 710 allows two colors to be passed at a time, thereby enabling beam scrolling as described above, and nearly doubling the spectrum efficiency of the system. The overall brightness of the system is enhanced by incorporating the yellow color. Further, since the red color is passed half of the time, a good color gamut can be achieved.

2—Panel Optical Display System

Figure 8:
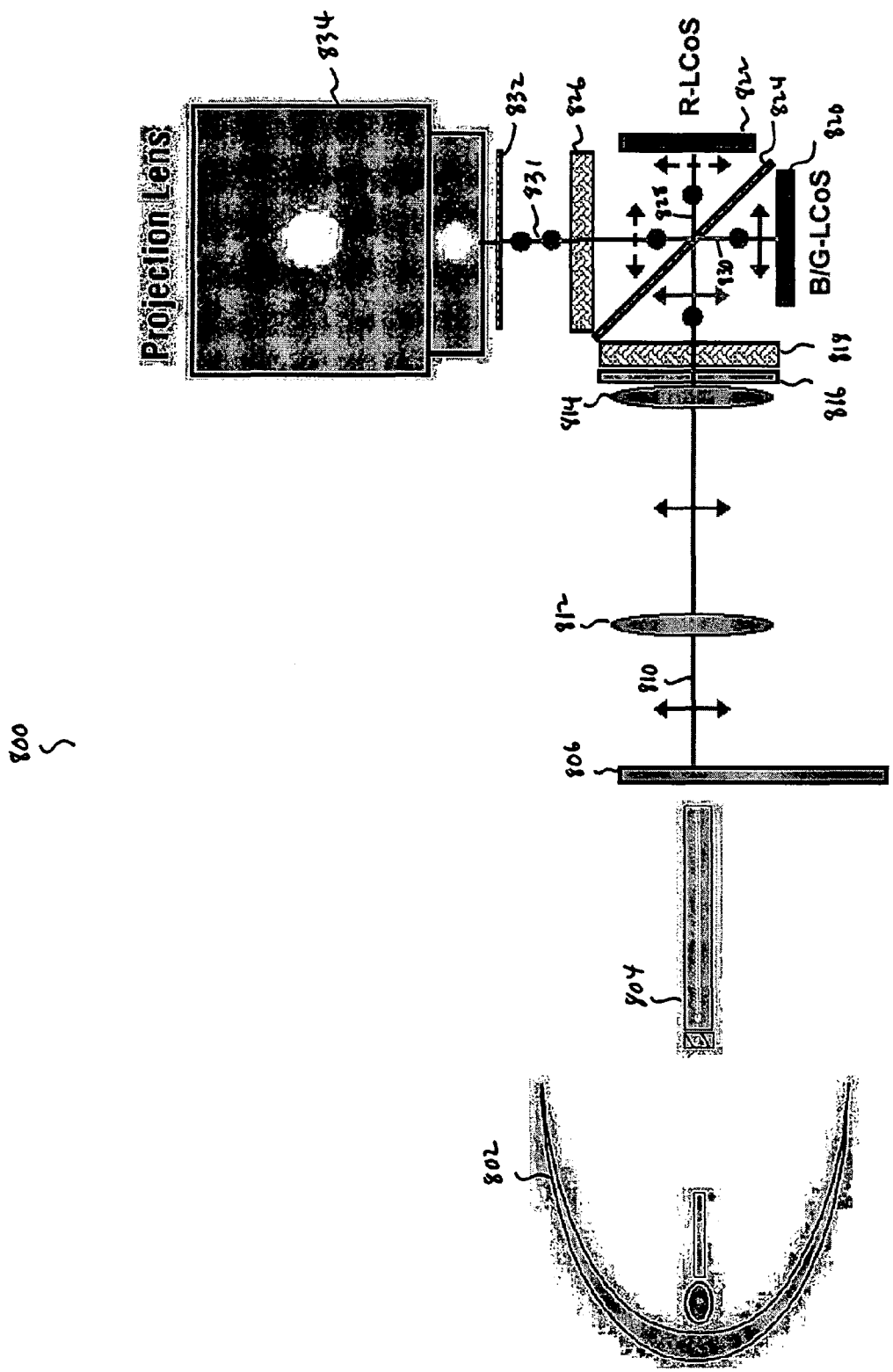
FIG. 8 is a block diagram that illustrates a 2-Panel display system.

FIG. 8 is a block diagram that illustrates an example 2-Panel display system. As noted above, two-panel display systems provide enhanced brightness compared to single-panel systems, by dedicating a second panel to receive more color components of the emitted light. In the example of FIG. 8, lamp 802 emits a polychromatic light. Lamp 802 may be a high pressure lamp, for example. Light from lamp 802 is first passed through a lightpipe 804 for purposes of homogenization of the illumination and polarization conversion. The polarization conversion portion of the lightpipe 804 is typically needed because the light emitted by lamp 802 is generally unpolarized. At the output of lightpipe 804, light is polarized. In the example of FIG. 8, light is p-polarized after exiting lightpipe 804 (the electric field of the light oscillates in the plane of the diagram).

At the exit surface of lightpipe 804, a color wheel 806 is positioned such as to receive the light from lightpipe 804 and generate filtered light 810. Color wheel 806 is typically divided into one or more color filter segments. The sizes of the different segments may or may not be equal depending on the optical system. Further, color wheel 806 typically rotates so as to sequentially place different color filters in the path of the polychromatic light. Accordingly, color wheel 806 sequentially passes different color components of the polychromatic light. The rotation speed of color wheel 806 is related to a frame refresh rate of display system 800.

Still referring to FIG. 8, filtered light 810 is passed through one or more relay lenses, as illustrated by relay lenses 812 and 814, to focus the light in the direction of light modulating panel 822. A yellow notch filter 818 filters the yellow color component of filtered light 810, before passing it through a color select filter 818. The yellow color is filtered to improve the color gamut of the system. Color select filter 818 converts the polarization of certain color components of the light while keeping the polarization of other components unchanged. For example, as shown in FIG. 8, color select filter 818 converts the polarization of the red color component (s-polarized) while keeping the polarization of the green and blue components (p-polarized) in the same polarization as that of the incoming light. Accordingly, when the light reaches polarization beam splitter (PBS) 824, certain components of the light are passed through without reflection in the direction of light modulating panel 822, while other components are reflected in the direction of light modulating panel 820. For example, as illustrated in FIG. 8, the red color component of the light is passed to panel 822, while the green and blue color components are reflected to panel 820.

Still referring to FIG. 8, light modulating panel 822 modulates light 828 according to voltage values applied to pixels of the panel. Typically, a pixel of light modulating panel 822 reflects, deflects, or blocks light 828 according to a voltage applied thereto, thereby modulating the brightness of light 828. In the example of FIG. 8, light modulating panel 822 modulates the red color component of the light. Similarly, light modulating panel 820 modulates light 830 according to voltage values applied to pixels of the panel. Typically, a pixel of light modulating panel 820 reflect, deflects, or blocks light 830 according to a voltage applied thereto, thereby modulating the brightness of light 830. In the example of FIG. 8, light modulating panel 820 modulates the green and blue color components of the light. Light modulating panels 820 and 822 may be LCoS panels as shown in FIG. 8. In other embodiments, light modulating panels 820 and 822 may be transmissive liquid crystal displays (LCD) or digital mirrors such as Digital Light Processing (DLP) panels. Further, light modulating panels 820 and 822 convert the polarization of lights 828 and 830 such that upon reflection by the panels, light 830 is passed without reflection through PBS 824 while light 828 is reflected in the direction of projection lens 834.

Still referring to FIG. 8, lights 828 and 830 are passed through a color select filter 826. Color select filter 826 converts the polarization of one of lights 828 and 830 such that components of outgoing light 831 are all of the same polarization. A post-polarizer 832 is further used prior to light 831 reaching projection lens 834 to remove any remaining light components of unwanted polarization. This generally improves the contrast ratio of the image. Projection lens 834 receives light 831 and projects a corresponding color image.

Figure 9:
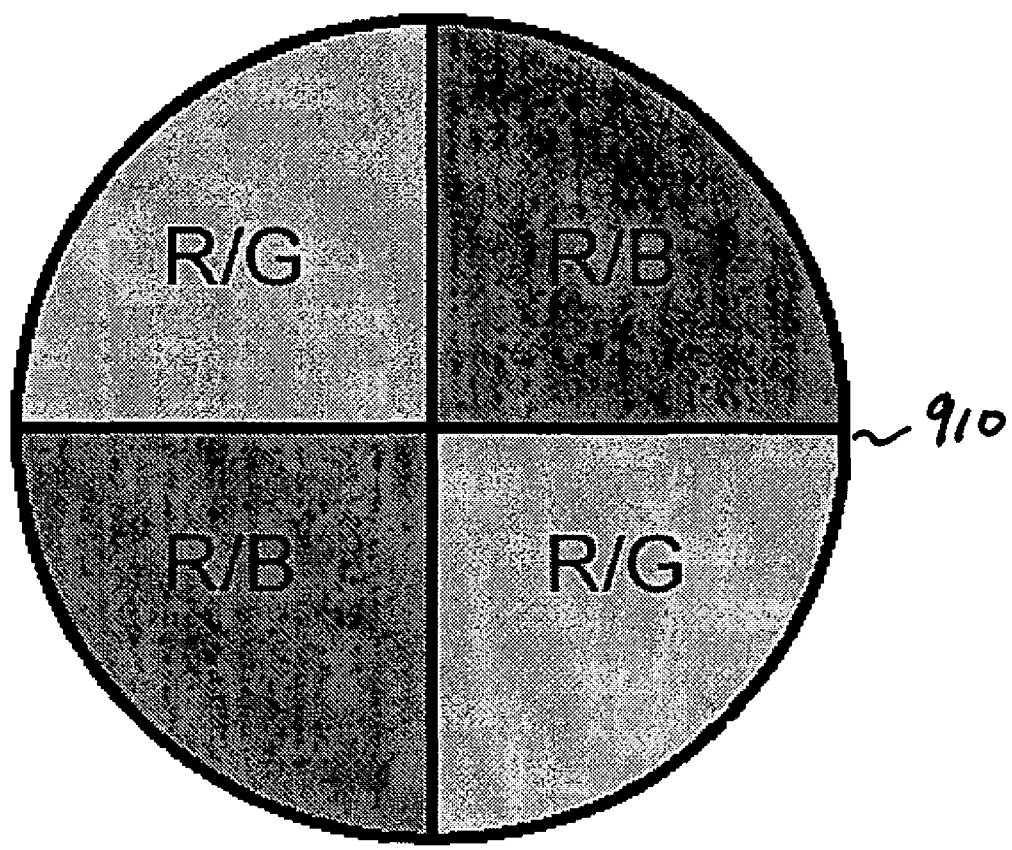
FIG. 9 illustrates a color wheel that may be employed in the system of FIG. 8.

FIG. 9 illustrates a color wheel 910 that may be employed in the system of FIG. 8. Color wheel 910 may be used for color wheel 806 in FIG. 8. Color wheel 910 includes two R/G filter segments and two R/B filters segment all of equal size. Typically, the actual proportion of each segment depends on the system design to achieve the desired brightness, color gamut, and white point. Color wheel 910 allows two colors to be passed at a time. For example, color wheel 910 may pass the red color in conjunction with the green color or the blue color as shown FIG. 9.

When used in the system of FIG. 8, color wheel 910 improves the spectrum efficiency of the system by passing two colors at a time. However, by filtering out the yellow color to ensure a good color gamut, the lumen output of the lamp is not optimally utilized.

Methods and systems for multiple primary color display for 2-Panel optical systems will now be provided according to embodiments of the present invention.

Figure 10:
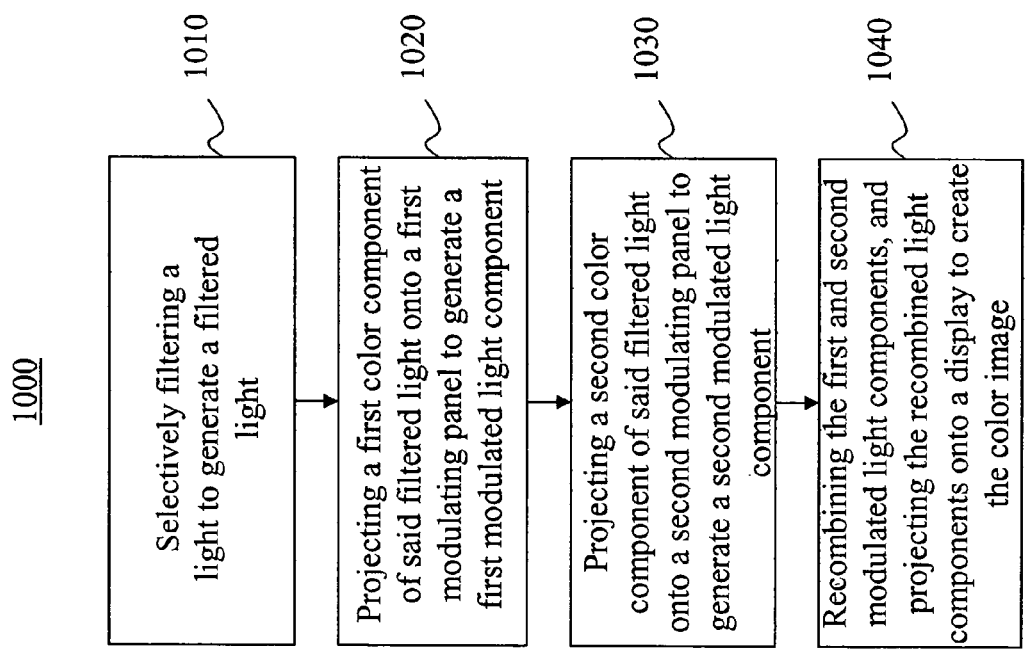
FIG. 10 is a process flowchart for a multiple primary color display.

FIG. 10 is a process flowchart 1000 for a multiple primary color display method according to an embodiment of the present invention. Process flowchart 1000 begins in step 1010, which includes selectively filtering a light to generate a filtered light. In an embodiment, the filtered light is not a primary color. In an embodiment, step 1010 includes passing the light through a rotating color wheel that includes one or more color filter segments, thereby sequentially passing different color components of the light. In an embodiment, the color wheel includes no primary color filter segments. For example, the color wheel includes no red (R), green (G), blue (B), or yellow (Y) filter segments. In another embodiment, each of the one or more color filter segments of the wheel passes a pair of primary color components. In an embodiment, the color filter segments include a Y/G filter segment, which passes yellow and green color components of the light. In another embodiment, the color filter segment includes a R/B filter segment, which passes red and blue color components of the light.

Step 1020 includes projecting a first color component of the filtered light onto a first modulating panel to generate a first modulated light component. In an embodiment, the first modulating panel is a LCoS panel. In other embodiments, the first modulating panel is a transmissive liquid crystal display (LCD) or a digital mirror such as a Digital Light Processing (DLP) panel. In an embodiment, step 1020 includes separating the filtered light into first and second color components. In an embodiment, the first color component includes the red color component of the filtered light. In another embodiment, the first color component includes the yellow color component of the filtered light.

Step 1030 includes projecting a second color component of the filtered light onto a second modulating panel to generate a second modulated light component. In an embodiment, the second modulating panel is a LCoS panel. In other embodiments, the second modulating panel is a transmissive liquid crystal display (LCD) or a digital mirror such as a Digital Light Processing (DLP) panel. In an embodiment, step 1030 includes separating the filtered light into first and second color components. In an embodiment, the second color component includes the blue color component of the filtered light. In another embodiment, the second color component includes the green color component of the filtered light.

Step 1040 includes recombining the first and second modulated light components, and projecting the recombined light components onto a display to generate the color image. In an embodiment, step 1040 includes converting the polarization of the first and/or second modulated light components as necessary to ensure that they are of the same polarization. Further, step 1040 may include removing any light components of unwanted polarization from the recombined light components before reaching a projection lens, which projects the color image onto a display.

Figure 11:
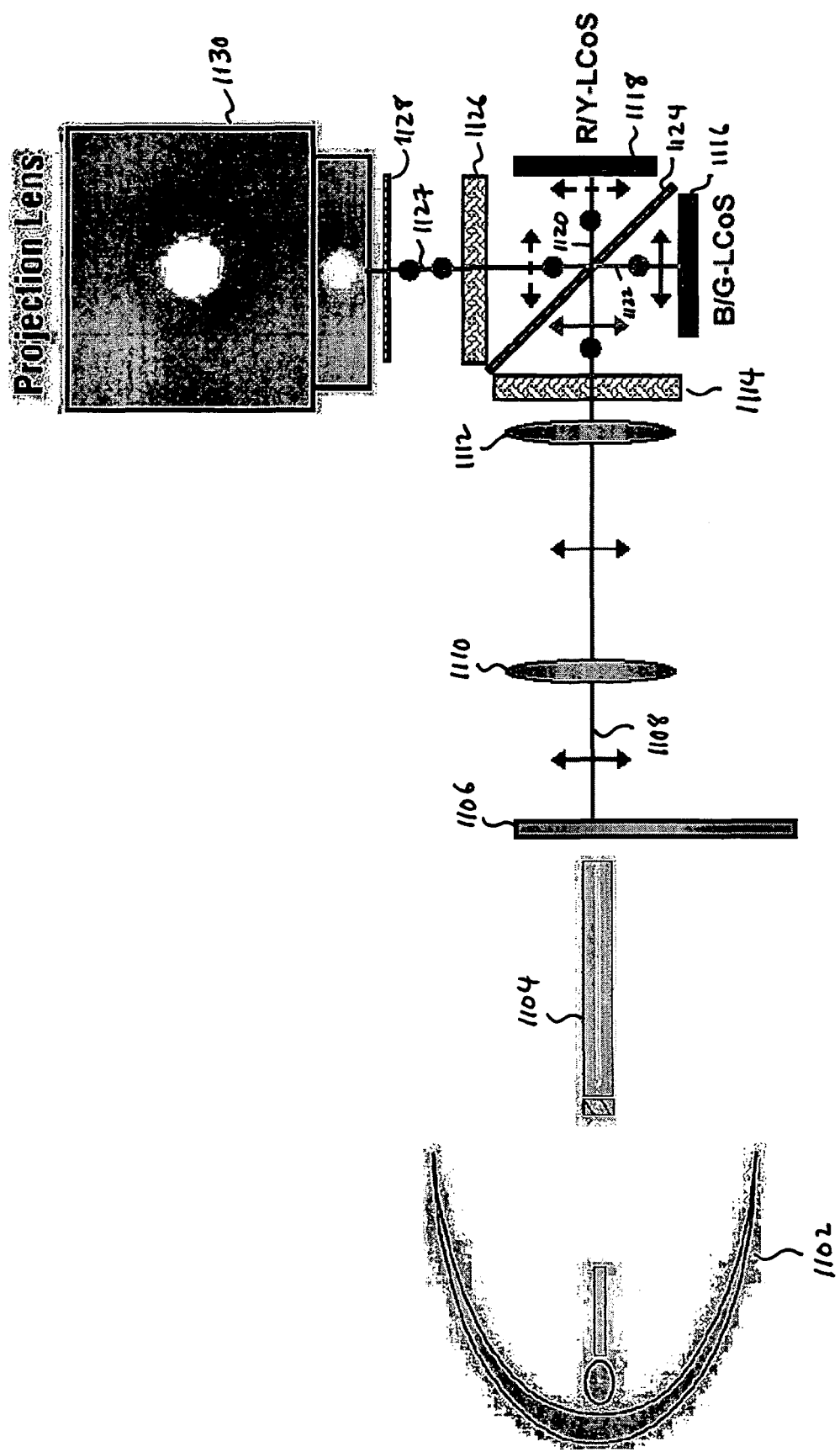
FIG. 11 is a block diagram that illustrates an example multiple primary color display system.

FIG. 11 is a block diagram that illustrates an example multiple primary color display system 1100 according to an embodiment of the present invention. System 1100 may be used to implement process flowchart 1000.

In the example of FIG. 11, lamp 1102 emits a polychromatic light. Lamp 1102 may be a high pressure lamp, for example. Light from lamp 1102 is first passed through a lightpipe 1104 for purposes of homogenization of the illumination and polarization conversion. Lightpipe 1104 is typically needed because the light emitted by lamp 1102 is generally unpolarized. At the output of lightpipe 1104, light is polarized. In the example of FIG. 11, light is p-polarized after exiting lightpipe 1104 (the electric field of the light oscillates in the plane of the diagram).

Referring to FIG. 11, at the exit surface of lightpipe 1104, a color wheel 1106 is positioned such as to receive the light from lightpipe 1104 and generate filtered light 1108. Color wheel 1106 is typically divided into one or more color filter segments. The sizes of the different segments may or may not be equal depending on the optical system. Further, color wheel 1106 rotates so as to sequentially place different color filters in the path of the polychromatic light. Accordingly, color wheel 1106 sequentially passes different color components of the polychromatic light. The rotation speed of color wheel 1106 is related to a frame refresh rate of display system 1100. In other embodiments, the color wheel may be replaced with a color drum or liquid crystal (LC) shutters.

Still referring to FIG. 11, filtered light 1108 is passed through one or more relay lenses, as illustrated by relay lenses 1110 and 1112, to focus the light in the direction of light modulating panels 1118 and 1116. A color select filter 1114 converts the polarization of certain color components of the light while keeping the polarization of other components unchanged. For example, as shown in FIG. 11, color select filter 1114 converts the polarization of the red and yellow color components while keeping the polarization of the blue and green color components unchanged. Accordingly, when the light reaches polarization beam splitter (PBS) 1124, certain components of the light are passed through without reflection in the direction of light modulating panel 1118, while other components are reflected in the direction of light modulating panel 1116. For example, as illustrated in FIG. 11, the red and yellow color components are passed toward panel 1118, while the blue and green color components are reflected toward panel 1116.

Still referring to FIG. 11, light modulating panel 1118 modulates light 1120 according to voltage values applied to pixels of the panel. Typically, a pixel of light modulating panel 1118 reflects or blocks light 1120 according to a voltage applied thereto, thereby modulating the brightness of light 1120. In an embodiment, light modulating panel 1118 modulates the red color component of the light emitted by lamp 1102. In another embodiment, light modulating panel 1118 modulates the yellow color component of the light emitted by lamp 1102. Similarly, light modulating panel 1116 modulates light 1122 according to voltage values applied to pixels of the panel. Typically, a pixel of light modulating panel 1116 reflects or blocks light 1122 according to a voltage applied thereto, thereby modulating the brightness of light 1122. In an embodiment, light modulating panel 1116 modulates the blue color component of the light emitted by lamp 1102. In another embodiment, light modulating panel 1116 modulates the green color component of the light emitted by lamp 1102. Light modulating panels 1116 and 1118 may be LCoS panels as shown in FIG. 11. Further, light modulating panels 1116 and 1118 convert the polarization of lights 1120 and 1122 such that upon reflection by the panels, light 1122 is passed without reflection through PBS 1124 while light 1120 is reflected in the direction of projection lens 1130.

Still referring to FIG. 11, lights 1120 and 1122 are passed through a color select filter 1126. Color select filter 1126 converts the polarization of one of the lights 1120 and 1122 such that components of outgoing light 1127 are all of the same polarization. A post-polarizer 1128 is further used prior to light 1127 reaching projection lens 1130 to remove any remaining light components of unwanted polarization. This generally improves the contrast ratio of the image. Projection lens 1130 receives light 1127 and projects a corresponding a color image.

Figure 11A:
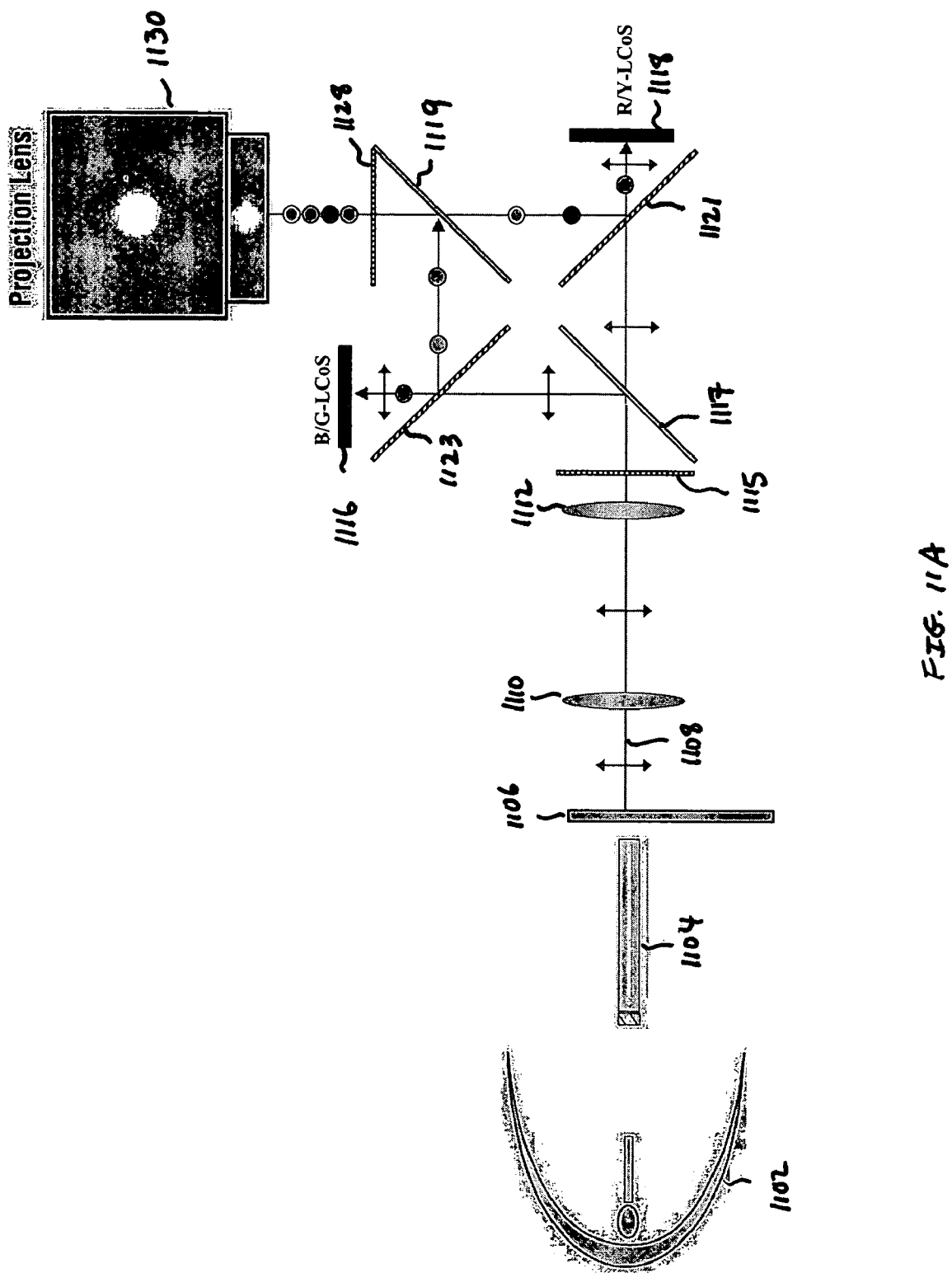
FIG. 11A is a block diagram that illustrates another example multiple primary color display system.

FIG. 11A is a block diagram that illustrates another example multiple primary color display system according to an embodiment of the present invention. In the system of FIG. 11A, color select filters 1114 and 1126 of the system of FIG.

11 are replace with dichroic filters 1117 and 1119, as shown in FIG. 11A. Dichroic filters 1117 and 1119 reflect or pass with minimal reflection incoming light depending on the polarization of the light. Accordingly, in FIG. 11A, pre-polarization filter 1115 converts the polarization of incoming light depending on which modulating panel the incoming light needs to be modulated. For example, pre-polarization filter 1115 controls the polarization of blue and green light components such that they are reflected in the direction of modulating panel 1116, and controls the polarization of red and yellow light components such that they are passed with minimal reflection in the direction of modulating panel 1118. Subsequently, PBS 1121, PBS 1123, and dichroic filter 1119 ensure that light components are re-combined and passed through post-polarization filter 1128.

Figure 12:
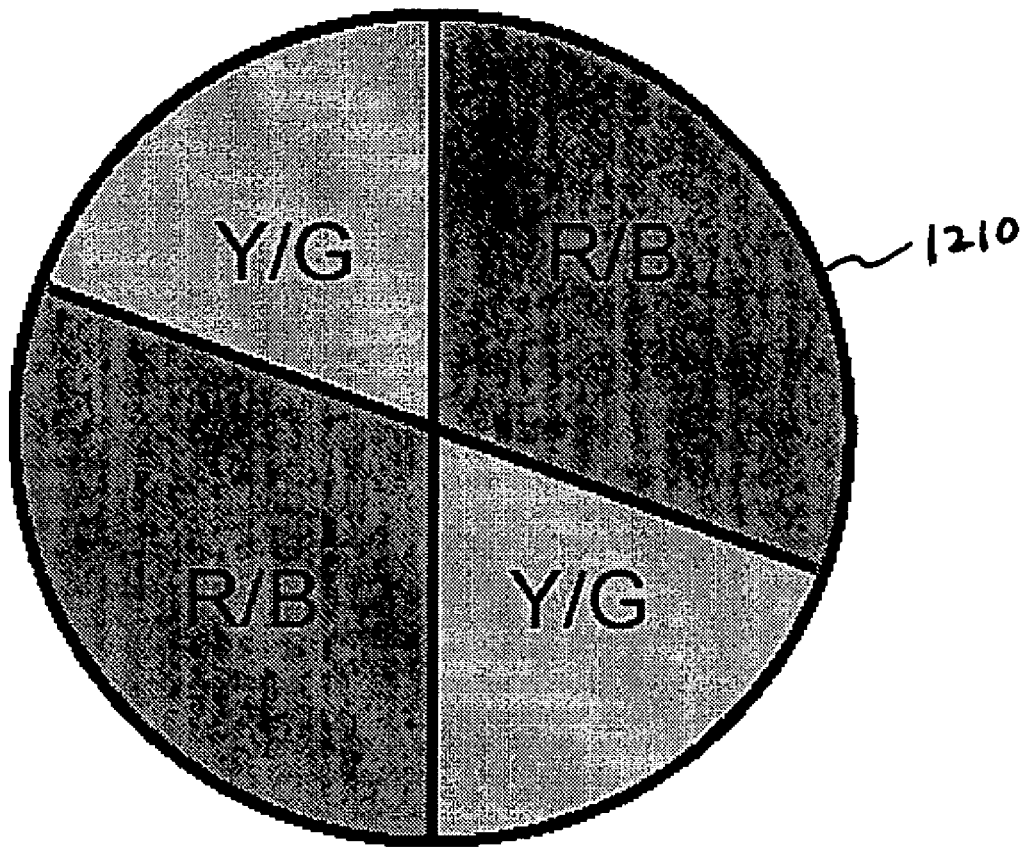
FIG. 12 illustrates a color wheel that may be employed in the system embodiment of FIG. 11.

FIG. 12 illustrates a color wheel 1210 that may be employed in the system embodiment of FIG. 11. Color wheel 1210 may be used for color wheel 1106 in FIG. 11. Color wheel 1210 includes two R/B filter segments and two Y/G filter segments. The size of the R/B segments is larger than the size of the Y/G filter segments. This is because the addition of the yellow color must be accompanied by an increase in the blue color so that the white point is not affected toward lower color temperature. Typically, the actual proportions of the segments depends on the system design to achieve the desired brightness, color gamut, and white point.

Color wheel 1210 allows two colors to be passed at a time. For example, color wheel 1210 simultaneously passes the yellow and green color components and the red and blue color components. Variations to the example of FIG. 12 can also be employed as understood by a person skilled in the art. It is noted here that depending on system design, more than four colors may also be passed. For example, in certain display systems five or six colors may be passed during a full wheel cycle.

When used in the system of FIG. 11, color wheel 1210 results in an enhanced overall brightness of the system due to the incorporation of the yellow color. Further, by passing red in larger proportions, the system compensates for the lack of red light in the output of a high pressure lamp, and achieves an improved color gamut. Additionally, the overall lumen output of the system is no longer limited by the intensity of the green light as is the case for the system of FIG. 8, for example. This is because with the addition of the yellow light, the intensity of the green light can be reduced. Further, the system provides a more adequate distribution of the light to each panel compared with the system of FIG. 8, which dedicates panel 822 for a single light component.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for displaying a color image on a display, comprising:
   (a) passing a light through a selective color filter to generate a filtered light, wherein the selective color filter is divided into one or more color filter segments, thereby sequentially passing different color components of the light;
   (b) spatially separating said filtered light into at least first and second beams;
   (c) projecting said at least first and second beams onto a modulating panel to generate at least first and second modulated light beams; and
   (d) projecting said first and second modulated light beams onto the display to create the color image;
   wherein each of the one or more color filter segments passes a pair of primary color components.

2. A method for displaying a color image on a display, comprising:
   (a) passing a light through a selective color filter to generate a filtered light, wherein the selective color filter is divided into one or more color filter segments, thereby sequentially passing different color components of the light;
   (b) spatially separating said filtered light into at least first and second beams;
   (c) projecting said at least first and second beams onto a modulating panel to generate at least first and second modulated light beams; and
   (d) projecting said first and second modulated light beams onto the display to create the color image;
   wherein the one or more color filter segments comprise a yellow/blue filter segment, that passes yellow and blue color components of the light.

3. A method for displaying a color image on a display, comprising:
   (a) passing a light through a selective color filter to generate a filtered light, wherein the selective color filter is divided into one or more color filter segments, thereby sequentially passing different color components of the light;
   (b) spatially separating said filtered light into at least first and second beams;
   (c) projecting said at least first and second beams onto a modulating panel to generate at least first and second modulated light beams; and
   (d) projecting said first and second modulated light beams onto the display to create the color image;
   wherein the one or more color filter segments comprise a red/green filter segment, that passes red and green color components of the light.

4. A method for displaying a color image on a display, comprising:
   (e) passing a light through a selective color filter to generate a filtered light, wherein the selective color filter is divided into one or more color filter segments, thereby sequentially passing different color components of the light;
   (f) projecting a first color component of said filtered light onto a first modulating panel to generate a first modulated light component;
   (g) projecting a second color component of said filtered light onto a second modulating panel to generate a second modulated light component; and
   (h) recombining the first and second modulated light components, and projecting the recombined light components onto the display to create the color image;
   wherein the one or more color filter segments comprise a yellow/green filter segment and a red/blue filter segment.

5. The method of claim 4, wherein the first modulating panel modulates a red color component of the filtered light, and wherein the second modulating panel modulates a blue color component of the filtered light.

6. The method of claim 4, wherein the first modulating panel modulates a yellow color component of the filtered light, and wherein the second modulating panel modulates a green color component of the filtered light.

* * * * *